United States Patent [19]
Gallegos

[11] Patent Number: 6,076,769
[45] Date of Patent: Jun. 20, 2000

[54] HYBRID FUEL CONTAINMENT STRUCTURE

[75] Inventor: David Paul Gallegos, Palmdale, Calif.

[73] Assignee: Northrop Grumman Corporation, Los Angeles, Calif.

[21] Appl. No.: 09/264,606

[22] Filed: Mar. 8, 1999

[51] Int. Cl.[7] .............................................. B64D 37/00
[52] U.S. Cl. ................................ 244/135 B; 244/135 R; 280/830
[58] Field of Search ........................... 244/135 R, 135 B; 280/830, 831

[56] References Cited

U.S. PATENT DOCUMENTS

| | | | |
|---|---|---|---|
| 2,458,570 | 1/1949 | Davidson et al. | 248/200 |
| 2,736,521 | 2/1956 | Bosserman | 244/135 |
| 2,859,812 | 11/1958 | Swanson | 160/368 |
| 2,861,707 | 11/1958 | Moorman | 220/15 |
| 3,461,104 | 8/1969 | Stewart | 260/75 |
| 3,475,383 | 10/1969 | Stewart | 260/75 |
| 3,506,224 | 4/1970 | Harr et al. | 244/135 |
| 3,567,536 | 3/1971 | Wickersham, Jr. | 156/78 |
| 3,787,279 | 1/1974 | Winchester | 161/160 |
| 4,368,086 | 1/1983 | Villemain | 244/135 B |
| 4,434,021 | 2/1984 | Robinson et al. | 156/242 |
| 5,298,303 | 3/1994 | Kerr et al. | 428/35.7 |
| 5,845,879 | 12/1998 | Jensen | 244/135 B |
| 5,927,651 | 7/1999 | Geders et al. | 244/135 B |
| 5,975,466 | 11/1999 | Kahara et al. | 244/135 B |

*Primary Examiner*—J. Woodrow Eldred
*Attorney, Agent, or Firm*—Terry J. Anderson; Karl J. Hoch, Jr.

[57] ABSTRACT

A fuel containment area, and method of forming the same are disclosed herein. A fuel containment area is defined in part by a vehicle interior structure, such as an aircraft wing. Portions of the fuel containment area are provided with elastomeric partial bladders or appliqués to bridge sections of the vehicle interior structure, to provide additional container integrity, and/or to segregate fuel from certain areas of the vehicle interior, e.g., about electrical components, mechanical leakages, or high temperature areas. The appliqués are sealed to the vehicle interior by flexible transition joints to define a continuous, hybrid fuel container.

4 Claims, 5 Drawing Sheets

Flexible Transition Joint

Alt. Flexible Transition Joint

Joining Surface Formed from Structural Foam

Fig 7

HYBRID FUEL CONTAINMENT STRUCTURE

FIELD OF THE INVENTION

The present invention relates to fuel tanks, or fuel containment areas, formed within a vehicle structure, such as an aircraft wing or fuselage.

BACKGROUND OF THE INVENTION

The present invention relates to a device and process for joining and sealing sections of flexible material, such as material used to make up removable bladder tanks used to contain fuel or other liquids in aircraft or land vehicles, to aircraft or vehicle structure interior elements such as skins, ribs or bulkheads, for in-situ formation of a fluid tight container in the aircraft or vehicle.

Fuel containers for applications such as an aircraft typically face stringent weight and space requirements. Voids in structures such as fuselage and wing cavities are reserved to serve as fuel storage areas capable of storing substantial volumes of fuel. However, the voids are not simply filled with flammable fuel. Instead, various techniques have been developed for accommodating fuel storage requirements within such voids.

In one technique, the area within an aircraft fuselage or wing, is provided with an impervious bladder, formed outside of the aircraft and custom designed to accommodate the structural arrangement within the fuselage or wing. Various techniques have been proposed in relation to the construction of the bladder, the means for supporting the bladder within the structure, and the means for attaching the bladder to the structural members. While such bladder constructions are useful in that they provide a well-defined fuel containment area, they suffer from several generic technical and cost disadvantages. One such disadvantage relates to the need to custom design the bladder, outside of the aircraft or vehicle, to accommodate the specific structural arrangement and aircraft subsystems that must penetrate the structure and bladder. Abrasion of the bladder against protruding structural members may also be a concern, as well as the need to closely mate any support for the bladder about irregular structural features. Still further, mechanisms for securing the bladder to a structure may be cumbersome and expensive, particularly about irregular surface areas.

Another general technique for forming fuel compartments within an aircraft or vehicle is referred to as an integral construction technique. In that technique, no separate bladder is formed. Instead, interior cavities formed by structure surfaces of the fuselage or wing are sealed with hand applied or sprayed sealing materials which define a fluid chamber within the aircraft or vehicle (spaced from wing outersurface portions). The layers of sealing material may be formed in various ways, and in various configurations. Areas about irregular structural features may be sealed from the fluid chamber by selective placement of spacing material, with sealing material disposed upon the surface of the spacing material.

Such integral construction techniques have an advantage in that they do not require the external construction of a customized bladder, and avoid the difficulties that can be associated with subsystem penetrations and locating and securing such bladders. However, such integral construction techniques do not capitalize on the advantages of the bladder constructions, such as the additional containment integrity and fuel containment advantages associated with bladders. Moreover, such integral construction techniques may require tedious assembly insofar as the containment area is typically not complete until the fuselage and wing body is fully assembled, and containment integrity may be difficult to assure.

The present invention is directed to a structure and technique of forming hybrid fuel containers which capitalize on the advantages of both bladder construction and integral construction. By the present invention, a fuel container is constructed wherein certain portions are formed using an integral construction technique, particularly in areas where surface irregularities may make bladder construction cumbersome and less reliable. Other portions of the fuel container are defined by a section of flexible material, which is secured and sealed to the integrally-formed portion by a flexible transition joint to facilitate the definition of a continuous fuel container area. The flexible material may be conveniently joined to the integrally-formed portion prior to complete construction of the wing body such that the fuel container may be defined and inspected prior to complete assembly of the wing. The flexible material may be arranged in areas less subject to structural irregularity to multiple disadvantages associated with contemporary bladder constructions.

SUMMARY OF THE INVENTION

A fuel containment area, and method of forming the same are disclosed herein. A fuel containment area is defined in part by a vehicle interior structure, such as an aircraft wing or fuselage. Portions of the fuel containment area are provided with elastomeric appliques or partial bladders to bridge sections of the vehicle interior structure, to provide additional container integrity, and/or to segregate fuel from certain areas of the vehicle interior, e.g., about electrical components, mechanical leakages, or fluid critical areas such as high temperature areas. The appliqués or partial bladders are sealed to the vehicle interior by flexible transition joints to define a continuous, hybrid fuel container.

In the disclosed embodiments, the vehicle interior structure is provided with an integral sealant liner formed on the vehicle interior surface. In certain areas, support material, such as foam, with the sealant layer formed thereon, may be used to form a regular continuous surface for convenient joining of the partial bladder or appliqué to the integral liner construction with the flexible transition joint.

The flexible transition joint may be formed in several ways. In one embodiment, the flexible transition joint is formed from a textile strip coated with elastomeric layers, having uncoated raw cloth in selective areas and peel-off TEFLON tape applied thereon to selectively prevent adhesion of the joint during in-situ installation. Flexible transition joints arranged about border regions of the appliqués or partial bladder material, bridge, join and seal the appliqués or partial bladder material to the vehicle innersurface having the sealing layer formed thereon. The elastomeric layers are applied to the transition joint strip to provide fluid integrity to the transition joint and may include a diffusion barrier layer of various materials, for example, nylon, such as used in fuel bladder constructions.

In another embodiment, a second textile crotch strip, set in a 180 degree fold, is sewn or fused midpoint to the back of the textile joining strip to facilitate additional strength integrity to the in-situ joint installation. In the same manner as in the first embodiment, elastomeric layers are applied to the joining strip for fluid integrity. The crotch strip remains uncoated raw cloth and may include application of TEFLON tape on multiple surfaces.

The broad concepts of the invention permit insight to formation of the fuel containment area by placement of bladder appliqués or partial bladders as convenient in the course of fabricating the vehicle structure. The partial bladders are preformed to fit specific structure arrangements and the bladder appliqués may be preformed or cut and fit on sight, both having edge portions that are secured and sealed to the lined vehicle innersurface by insight to application of the transition joint strips.

DETAILED DESCRIPTION OF THE PREFERRED EMBODIMENT

The detailed description set forth below in connection with the drawings is intended as a description of the presently preferred embodiments of the invention, and is not intended to represent the only forms in which the present invention may be constructed or utilized. The description sets forth the functions and the sequence of the steps for constructing and operating the invention in connection with the illustrated embodiments. It is to be understood, that the same or equivalent functions may be accomplished by different embodiments that are also intended to be encompassed within the scope of the invention.

As described below, the present invention provides a structure and technique for forming an integral/partial bladder fuel container having a flexible polymeric, textile reinforced bonded joint. The invention is not dependent upon a particular structure within which the container is formed, nor dependent upon a preformed bladder. Accordingly, the invention requires no unique mechanical design features of the aircraft structure, nor unique construction of the fuel bladder. As such, the present invention is readily adaptable to various aircraft for use within various aircraft wings, or other structures.

The present invention advantageously permits in-situ joining of a partial integral tank/partial bladder tank for fuel containment. In broad terms, the invention comprises three (3) principal components. The first component is an integral tank liner or laminate formed in-situ by continuous or selected applications of a single coat, or a plurality of coats of a liquid polymer sealant to the internal surfaces of an aircraft fuel cavity by spray or other process. Spacing or support materials such as foam blocks or the like may be used about the internal surface of the fuel cavity, as dictated by the particular construction arrangement. However, in broad terms, no such support material is necessary to implement the present invention.

The second general component of the present invention comprises a pre-made section of flexible material, such as a partial bladder or piece of fuel cell bladder material (appliqué). Unlike contemporary fuel bladders, a partial bladder may be sized or shaped as convenient to mate with the integral tank liner. As such, the partial bladder may be formed about that portion of the fuel cavity that requires least customizing of the bladder construction.

The third general component of the invention is a flexible transition joint designed for fluid-tight attachment of the integral tank liner and the partial bladder or appliqué. In one embodiment, the transition joint is formed as a flexible polymeric, textile reinforced, bonding strip that joins the partial fuel bladder to the integral tank laminate, or sprayed liner. The flexible transition joint is premade and procured in a roll, tape-type, form for as required cut-to-fit in-situ application, as the structure, e.g., wing body, is under construction. Manufacturing ease is therefore enhanced. The invention provides the ability to make in-situ modifications to the bladder shape or location where the partial bladder is joined to the tank liner. This process facilitates adaptations to accommodate changes to the wing structure, the placement of mechanisms or equipment within the wing structure, and other constraints.

As with contemporary fuel containers, various types of foam and the like may be used about the integral tank liner, or about the partial fuel bladder, in order to protect the bladder material from abrasion or enhance safety and performance when subjected to ballistic threats and associated ram energy. Similarly, the broader aspects of the invention permit a variety of different types of bladders and elastomeric material about the integral tank liner. It is anticipated that the partial bladder may be formed of light weight fuel cell material such as those defined by military standards—MIL-T-6396 or MIL-T-5578 constructions. It is anticipated that many commercially available polyurethane compounds would be suitable for use to form the integral tank laminate and/or the partial bladder material.

In the presently preferred embodiment, the sealant used is a plural component polyurethane having high strength, high elongation and flexibility, and high abrasion resistant properties. The polyurethane is highly resistant to traditional and contemporary hydrocarbon fuel, and long term aging degradation from exposure to extreme natural or operational environments, such as any combination of water or natural humidity, sulphur compounds, ozone, ultraviolet and infrared light, and continuous temperature in fuel up to 300 degrees fahrenheit.

Application of the polyurethane integral tank liner material to traditional or contemporary structure materials produces cohesive and adhesive values which facilitate coating in any thickness, including interrupted coating surfaces, i.e., non-continuous, having exposed edges that will not peel from exposure to fuel and/or extreme pressures and dynamic loads incidental to operation of the vehicle. The polyurethane is available in clear, white or black colors useful in assuring fluid tight integrity of the application.

Referring to the drawings, some exemplary arrangements are illustrated and are useful to describe the construction of a hybrid fuel container in accordance with the present invention.

Figure 1:
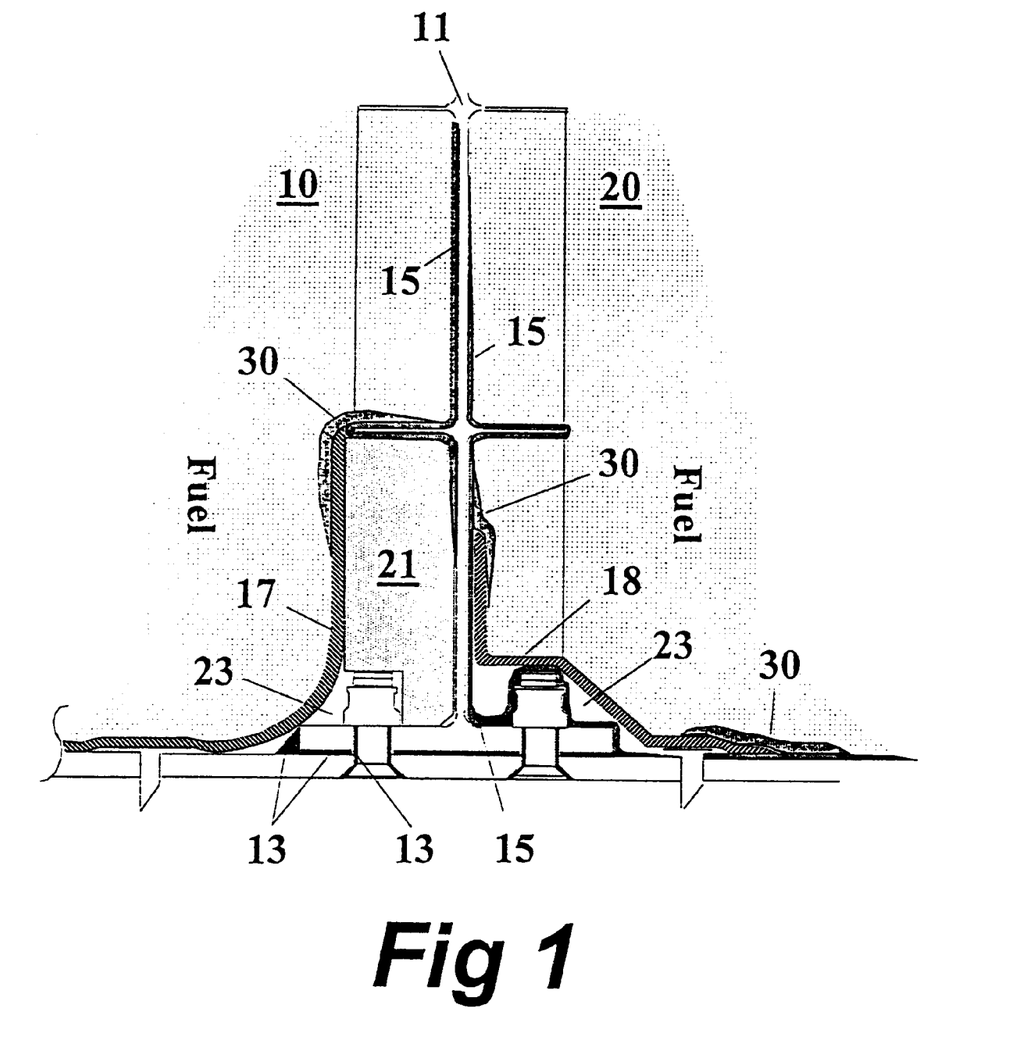
FIG. 1 is a sectional view showing the broad concepts of the invention having integral fuel tank liner portions formed upon the interior aircraft structure, partial bladder portions with support material, bladder applique portions, and flexible transition joints used to join bladder material and integral liner of the containers in-situ.

FIG. 1 illustrates the two hybrid containment concepts embodied by the present invention, having selective double redundant barrier containment area 10, and double and triple redundant barrier containment area 20, suitable for severe duty and environments. The containment areas are defined by vehicle internal structure 11, sealed during assembly by traditional application of fay/fillet and wet installed fasteners 13, followers by selective application of elastomeric sealant liner 15, sprayed or otherwise formed thereon, and partial bladder 17, or appliqués 18, joined to the liner by insight to the application of flexible transition joints 30. At present, it is anticipated that sealant 15 may be disposed in laminate layers of approximately 0.05 inch thick on fasteners and in high deflection areas, and as low as 0.01 inch thick where only corrosion protection is sought. The sealant may taper to 0.00 inch thick in non-critical, non-corrosive areas.

The left side of FIG. 1 illustrates the partial bladder concept of the invention wherein a preformed partial bladder is disposed within the vehicle, and appropriate filler material 21 may be provided adjacent the interior structure 11, about areas where chaffing may occur, or where simplification of the structurally conforming shape of the bladder is desired. Whereas in this example, the lower portion of containment area 10 is formed by a partial bladder 17, and sealed internal structure 11, sealant liner 15 may be disposed only on upper regions of the internal structure forming the vehicle. As such, a high integrity double barrier seal is formed on the upper portion of the containment area 10, e.g., sealed structure, integral tank liner. Joining and sealing the boundaries of the partial bladder to the integral liner by insight to the application of the transition joint 30, forms a double barrier, e.g., sealed structure, partial bladder, having between the barriers a drainable secondary leak path 23, capable of directing possible leakage from the primary barrier (bladder 17, away from critical vehicle bays or cavities. In some cases, it is anticipated that partial bladder sections may be sealed together at common boundaries, to limit the requirement or formation of larger, customized bladder sections. The partial bladders may be secured or restrained to internal structure by traditional attachments, such as lacing, or may be spot bonded by local application of the liner material, to prevent negative containment pressures from adversely working the bladder or transition joint.

The right side of FIG. 1 illustrates an integral tank concept or technique having selective double and triple redundant barriers capable of withstanding severe structure deflection or strain movement at mechanically fastened structure joints, or localized double or triple barriers between the containment area and adjacent areas sensitive to migration of flammable liquids such as the case between a fuel containment area and crew station of an aircraft.

In this integral concept, the containment area 20 is defined by vehicle internal structure 11 sealed during assembly by traditional application of fay/fillet sealing and wet installed fasteners 13, followed by selective application of elastomeric sealant liner 15 sprayed or otherwise formed thereon, and preformed or cut-to-fit pieces of bladder material or appliqués 18, joined to the liner by insight to the application of flexible transition joints.

Unlike traditional integral tank technics, the integral tank concept embodied by the present invention does not require the unique structure design features and double row fasteners necessary for additional joint stiffness to enable adequate sealant performance. In the present invention illustrated in FIG. 1, the physical properties of the integral liner material, e.g., approximately 4000 psi tensile strength and 300–500% elongation, in combination with the flexibility of the bladder material appliqué, solve for extreme deflections or strain and facilitate design of simplified, lightest weight fuel containment structure without consideration to limited sealant capability.

In practice, the integral containment area 20 may comprise a plurality of appliqués which are disposed adjacent to certain portions of the interior structure, seamed to the structure by flexible transition joints. In such cases, it is anticipated that there could be many appliqués or panels that may be so sealed with the vehicle interior structure, to collectively define a hybrid containment area formed by the interior structure (sealed with continued or uninterrupted layers of sprayable elastomeric, such as polyurethane) and bladder appliqués, sealed along the joints therebetween.

In some areas fuel bladder appliqués nay be disposed to create high integrity barrier regions adjacent to entire structure interior surfaces, or to positivewly seal smaller localized potential leak paths such as high deflection or strain joints. The material appliqués may be encased in the same sealing material used to line the structure interior surface. The material appliqués may be formed in various sizes and shapes, preformed or flat panel, and may be disposed on the internal structure in any orientation. In the same manner as the partial bladder, the bladder material appliqués may be secured or restrained to internal structure by traditional attachments, such as lacing, or may be spot bonded by local application of the liner material, to prevent negative containment pressures from adversely working the applique or transition joints.

Figure 2:
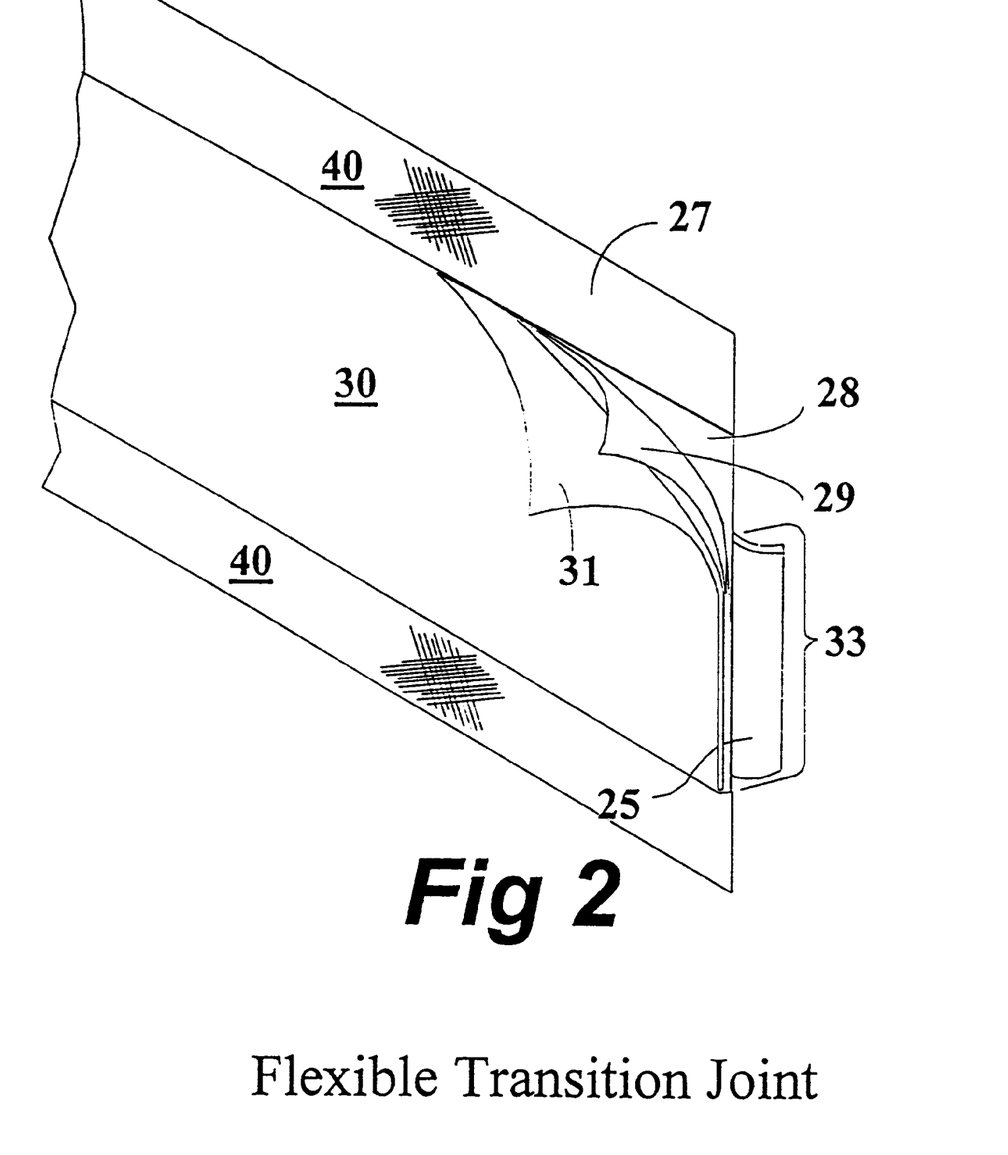
FIG. 2 is a perspective view of the flexible transition joint having elastomeric layers and TEFLON tape selectively applied to a textile joining strip for joining integral tank liner and bladder material portions of the container in-situ.

FIG. 2 illustrates the preferred embodiment of the construction of a flexible transition joint 30, formed as a flexible, polymeric, bonding strip. As shown therein, the joint 30 is formed as a multi-layer, flexible strip capable of mating to the sealing material, aircraft structure and/or elastomeric bladder by application of the same elastomeric material applied as the integral liner. The body of joint 30 is formed of a plurality of layers including a textile strength member 27, formed of a cloth material strip, such as four to eight ounce polyester, nylon or other textile to which the elastomeric material will readily adhere. FIG. 2 illustrates a coating selectively applied to a portion of the textile strip 27, such that raw cloth area 40 is exposed at the top, or top and bottom edges of the strip. It is anticipated that both top and bottom edges will be raw cloth to enhance the adhesive bond of the joint to liner, structure or bladder material. The coating placed to ensure fluid tight integrity at the joint line is formed from a 10 mil (0.010 inches thick) Preg coat 28, impregnating the cloth layer 27. Diffusion barrier 29, may be formed as a 2 mil (0.002 inches thick) diffusion barrier, applied to the surface of the Preg layer 28. Finish coat 31 is formed as a 10 to 5 mil (0.010 to 0.015 inches thick) final coat applied to the diffusion barrier 28.

As described in FIG. 2, the lower side 33 of the joint 30 is provided with a peel-off TEFLON tape 25. In the embodiment shown, the TEFLON tape 25 is applied to the back side of the joint 30 to facilitate an application process wherein the first step is to secure the upper part of joint 30, to the integral liner formed on the internal structure, and placement of non-adhering TEFLON tape 25 temporarily prevents the lower portion of the joint from adhering to the liner. Once the elastomeric liner material bonding the upper portion of the joint is cured, a sequential step is undertaken to remove the tape 25 and secure and seal the partial bladder or applique material with the lower portion of the joint.

Figures 3, 4:
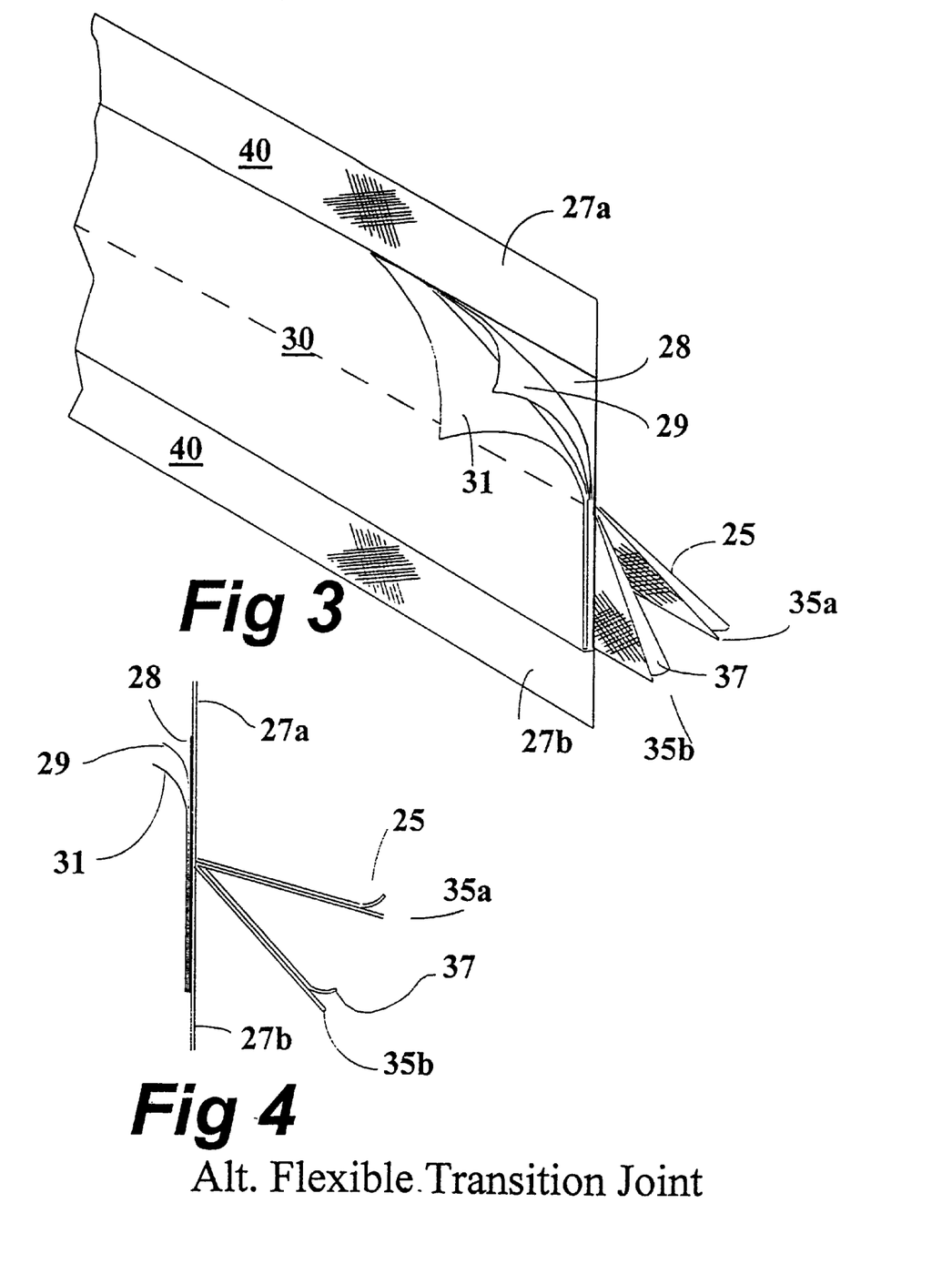
FIG. 3 is a perspective of the alternate flexible transition joint having a second textile strip attached at the back of the joint.
FIG. 4 is a section view of the alternate flexible joint wherein the transition joint is formed with a folded textile crotch strip sewn or fused to the joint prior to application of the elastomeric layers for fluid integrity of the textile elements at the connecting point.

FIG. 3 is an exemplary construction of an alternate flexible transition joint 30, providing an additional strength member formed as segments 35a and 35b to prevent the joint to integral liner application from going into peel and disbanding the joint. The figure illustrates the alternate joint having a second piece of folded textile cloth forming 35a and 35b, permanently attached, e.g., sewn or fused, extending down the center of the textile joining strip 27. In this case, TEFLON tape 25 is applied at the outside of fold segment 35a and TEFLON tape 37, is applied between the halves of the folded segment 35b. It is anticipated that the folded structural member segments 35a and 35b will remain uncoated raw cloth. Otherwise, multi-layer coating is selectively applied to the joining strip 27, in the same manner as described in FIG. 2, leaving raw cloth areas 40, at top or top and bottom edges of the joining strip 27.

FIG. 4 is a side view further illustrating the construction of the alternate transition joint defining multiple segments 27a, 27b, 35a, 35b, formed from two strips of textile cloth, one folded in half, permanently attached at their middles. The TEFLON tape 25 and 37 perform the same function as the TEFLON tape application described in the previous embodiment; to prevent adhesion during the process of securing and bonding the hybrid fuel container components in accordance with the present invention. However, in this embodiment the application of TEFLON tape 37 is permanent and is not meant to be removed.

Unlike the embodiment shown in FIG. 2, having only the upper portion of the joint attaching to integral liner, in this case segment 27a and segment 35a are attached and bonded to the integral liner formed on the internal structure. It should be understood, however, that if attachment of segment 27a and 35a to integral liner where accomplished at the same time, TEFLON tape 25, may not be necessary. As described above, bonding the bladder material between the remaining segment 35b and segment 27b forms a peel-proof textile v-strip at the joint between bladder material and integral liner, eliminating any possibility that forces pulling the bladder material away from the structure can impart peel forces on the joint between segment 25a and integral liner.

Figures 5, 6:
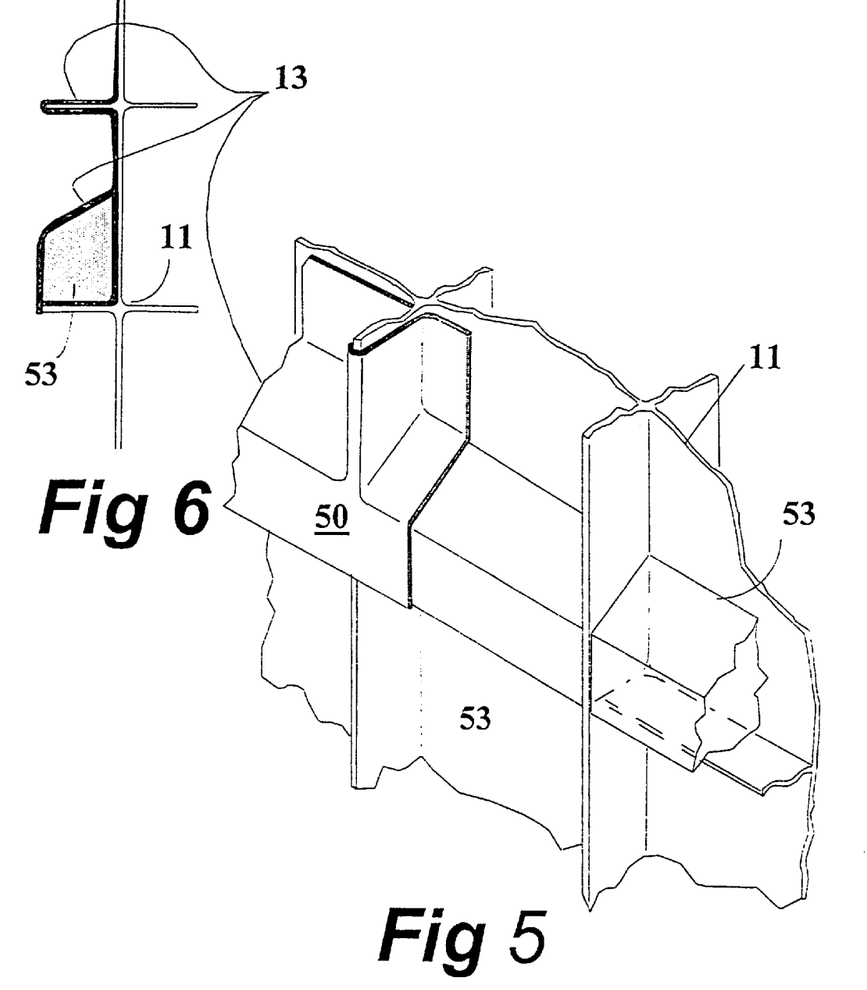
FIG. 5 is a sectional view detailing the broad concept of the flexible transition joint showing the application of structural foam as part of the joining method wherein integral tank liner material is used to bond and encapsulate the foam to the aircraft structure. The application of rigid structural foam and integral tank liner material to irregular aircraft internal structure surfaces, e.g., waffled bulkhead, forms a regular flat surface for establishing a transition joint to join liner and bladder material portions of the container in-situ.
FIG. 6 is a perspective view of the application of rigid foam and integral liner material forming a joining surface for the transition joint application in-situ.

FIG. 5 is a perspective view of an exemplary aircraft, waffle-type, structure 11, such as that shown in FIG. 1, whereupon a rigid structural foam 53 is disposed as part of the broad concept of the flexible transition joint. As shown, therein, rigid foam is disposed upon a first liner or layer of sealant material 15a, and then is itself encapsulated with a second layer of sealant material 15b. The application of rigid foam 53, bonded with liner sealant material 15, facilitates transformation of irregular aircraft internal structure surfaces, into a flat regular surface area 50 convenient for establishing a flexible transition joint line.

FIG. 6 is a side view further describing the application of rigid foam and integral liner material forming a joining surface for the transition joint application in-situ.

Figure 7:
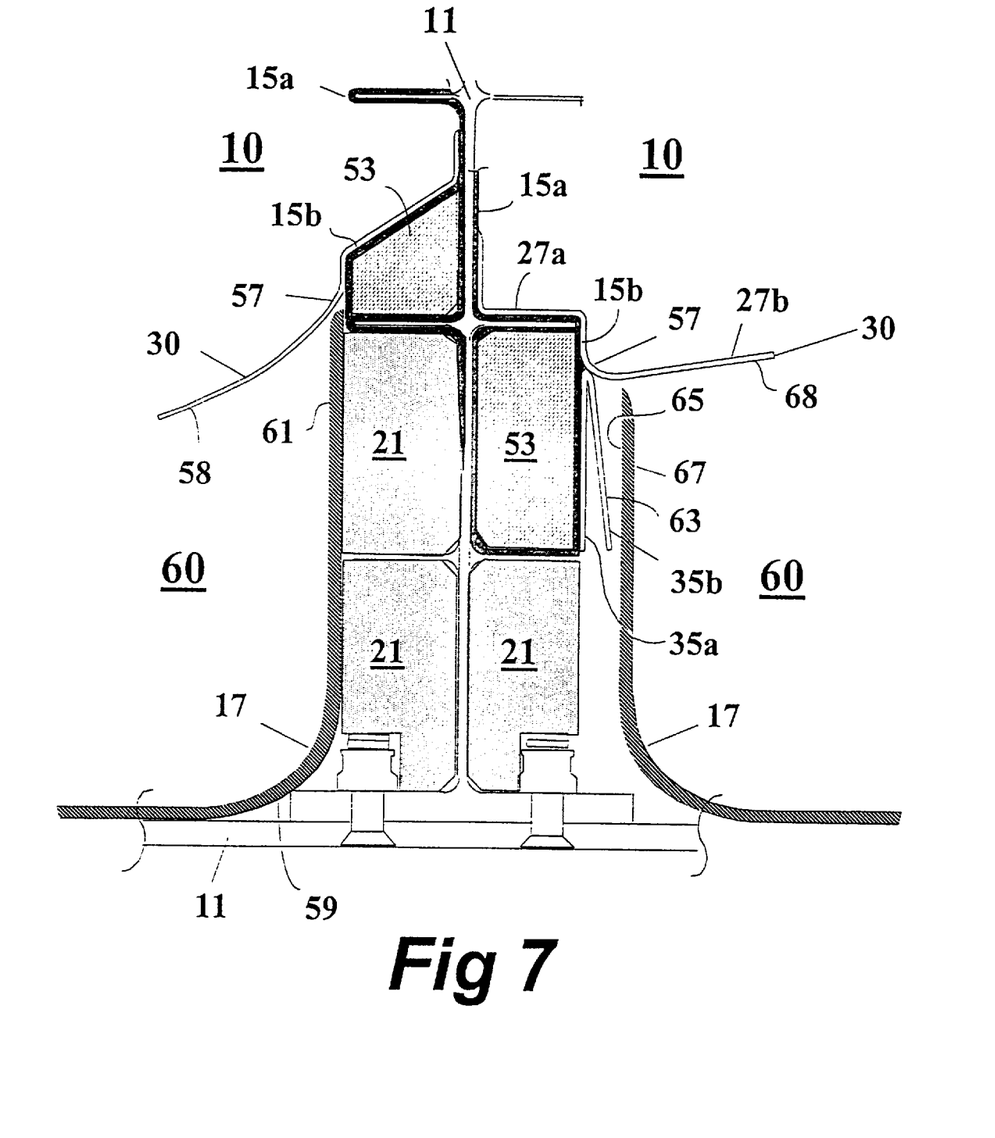
FIG. 7 is a section view of an aircraft waffle-type bulkhead on which the joint line surface is formed with rigid foam bonded and encapsulated to the structure by application of liquid polymeric integral tank liner material.

FIG. 7 is a side view further illustrating varying methods of constructing a hybrid fuel container in accordance with the present invention, and forming the same with insight to the application of the transition joint 30 and rigid foam 53. In the upper left-hand portion of FIG. 7, sealing layers, and rigid form 53, define a diminutive joint line surface, as described in connection with FIG. 7, for the purpose of minimizing weight. In this method, the rigid foam may be shaped to withstand dynamic fluid loads incidental to operation of the vehicle, and bodies of lightweight filler material 21 may be disposed adjacent aircraft structure 11 to buffer and support the partial bladder 17. Flexible joint 30 is applied to join the liner to the appliqué or partial bladder 17. In the illustrated embodiment, joint 30 extends from surface 55 of aircraft structure 11 (having first sealant layer 15a thereon) and along rigid foam 53 (having second layer of sealant material 15b formed thereon). It is to be understood, however, that the joint 30 need not necessarily extend adjacent rigid foam surface 15b and lined aircraft structure surface 55, but rather may extend across only one of the two.

As described in connection with FIG. 2, the upper portion of joint 30 is established to the liner leaving the lower portion free and loose by insight to the application of TEFLON tape. Extending the lower portion of joint 30 outward from the aircraft structure 11 adjacent separation point 57, permits the partial bladder 17 to extend adjacent the underside surface 58 of the joint 30. As with the joint 30, the partial bladder 17 may be disposed directly adjacent the aircraft structure 11, with or without the formation of an underlying sealing layer, rigid foam or filler material. In the embodiment shown, the underside 59 of the partial bladder 17 is disposed directly adjacent the aircraft structure 11.

Collectively, the aircraft structure 11, sealing layers 15a, 15b and joint 30 define integral tank portion of cavity 10. The partial bladder 17 and joint 30 defines the partial bladder portion of cavity 60. In order to join the integral portion 10 and bladder portion 60, the lower surface 58 of joint 30 is engaged and bonded to the upper surface 61 of the partial bladder 17. In the presently preferred embodiment, the lower surface 58 of joint 30 is covered by a peel-away TEFLON tape, that is separated to expose surface 58, which may include a portion of raw cloth. Layers of sealing material are applied to joint surface 58 and bladder surface 61 to form a fluid tight connection. A final layer of sealing material may be applied over the outside of the joint 30 and bladder 17 connection to ensure fluid-tight communication therebetween.

The right-hand portion of FIG. 7 shows yet another similar method of construction, and illustrates forming the hybrid container with insight to the application of the alternate transition joint. In this case, rigid foam material 53 is sized and shaped to conform to adjacent structure feature, forming a larger joint line surface. The upper portion of the flexible transition joint is engaged and bonded directly adjacent to the aircraft structure without the formation of rigid foam material. Otherwise, the construction and method of forming the integral tank portion 10 remains the same. Aircraft structure 11, sealing layer 15a, rigid foam 53 and sealing layer 15b form the integral portion 10 and joint line.

The alternate transition joint 30 is Illustrated with segment 27a and 35a engaged and bonded lo the integral sealant liner as described in connection with FIG. 5. Establishing these segments to the integral liner leaves segment 27b and 35b free and loose by insight to the application of TEFLON tape. Extending the lower segment 27b of joint 30 outward from the aircraft structure 11 adjacent separation point 57, permits the partial bladder 17 to extend adjacent the underside surface 63 of joint segment 35b. Engaging and bonding the partial bladder 17 between joint segments 27b and 35b joins the integral portion 10 and bladder portion 60.

In this embodiment, layers of sealing material are applied to surfaces 63 and 65 to form a peel-proof connection of joint segment 35b and partial bladder 17. By applying layers of seal material to surfaces 63 and 65, partial bladder 17 is engaged and bonded to joint segment 35b. Applying layers of seal material to surface 68 and 67 will join and bond joint segment 27b to partial bladder 17 to complete a liquid-tight construction of partial bladder portion 60. A final layer of sealing material may be applied over the outside of the joint 30 and bladder 17 connection to ensure fluid-tight communication therebetween.

CONSTRUCTION PROCESS

One construction technique for implementing aspects of the invention is as follows. Spray or brush mating surfaces of the structure and rigid foam with a flexible polyurethane integral sealant. Press coated surface of the rigid foam into the coated surfaces of the corresponding structure and allow to dry for two (2) hours.

Spray upper portion of the fuel cavity structure to be the integral tank with polyurethane sealant. Spray seal in accordance with polyurethane manufacturer's procedures, continuing application of sealant to completely cover rigid foam and adjacent structure sufficient to form a continuous flat joint line surface circumscribing the fuel cavity. Allow sealant to cure for two hours or until no longer tacky to touch.

Spray or brush coat polyurethane sealant to the joint line surface formed by rigid foam encapsulated with polyurethane sealant. Allow to set until tacky, and repeat a second coat. When the second coat becomes tacky, wet the bare cloth area of the flexible transition joint strip, with a suitable solvent, shake off excess and lay cloth into the tacky sealant. Smooth cloth into sealant with a cloth dampened with solvent and apply a brush coat of sealant to completely cover cloth. Allow too cure.

Install partial bladder, with cavity filler foam as applicable. Restrain bladder with mechanical methods, e.g., lacing, clips, etc., or bond top two (2) to four (4) inches of bladder to structure/rigid foam with polyurethane sealant. Place the loose end of the flexible joining band inside the bladder. To join the partial bladder and the integral tank, which now includes the flexible joint strip, spray or brush coat polyurethane sealant to the upper edge of the partial bladder adjacent the joint. Allow the coat to become tacky and repeat a second coat. When the second coat starts to tack, peel the TEFLON tape off the bonding side of the flexible joint strip and lay the joint strip into the tacky sealant. Smooth and remove air bubbles from the band with a cloth dampened with solvent. Allow to cure eight (8) hours. Completely scuff joint areas and one (1) inch beyond each edge with a scouring pad. Clean thoroughly with solvent and clean cloth. Spray seal scuffed area with two passes of polyurethane sealant to complete installation.

Accordingly, it is to be recognized that the present invention may be implemented in various techniques of construction, without departing from the broader aspects hereof. Commonly the various implementations facilitate in situ joining and sealing the edge of a partial fuel cell bladder to an aircraft or vehicle internal structure. As such, the invention defines both a fabrication process for joining and sealing a hybrid containment area, as well as the hybrid containment area so formed. Minor modifications to the process of forming the hybrid containment area, or in the resultant hybrid containment area formed thereby, are intended to be within the spirit and scope of the invention.

What is claim is:

1. A method of in-situ forming a fluid containment area within an aircraft wing housing, the fluid containment area being defined in part by the internal wing structure, and in part by the elastomeric bladder disposed within the wing structure, the method comprising:
    a) applying a first sealant layer to the internal surface of the wing structure;
    b) applying a bladder first sine to the first sealant layer;
    c) applying a flexible joint first portion to the first sealant layer;
    d) applying a flexible joint second portion to a bladder second side; and
    e) applying a second sealant layer about overlapping portions of the bladder and joint second portion.

2. A method of in-situ forming a fluid containment area within a vehicle housing, the containment area being defined in part by the vehicle interior structure and in part by an elastomeric bladder portion disposed within the vehicle housing, the method comprising:
    a) applying a first sealant layer to the internal vehicle structure;
    b) arranging a plurality of separate bladder appliqués about portions of the vehicle internal structure;
    c) applying a flexible first joint first portion to the first sealant layer;
    d) applying a flexible joint second portion to the bladder appliqué second side; and
    e) applying a second sealant layer about overlapping portions of the bladder appliqué and joint second portions.

3. A method of forming a fluid containment area within an aircraft fuselage housing, the fluid containment area being defined in part by the internal structure, and in part by a plurality of elastomeric bladder appliqués disposed within the fuselage structure, the method comprising:
    a) applying support material about portions of the internal structure surface;
    b) applying a first sealant layer to the internal surface of the structure and the support material;
    c) arranging a plurality of elastomeric bladder appliqués about the internal structures, upon the first sealant layer;
    d) arranging a plurality of flexible tape strips about the internal structure, bridging edge portions of the bladder appliqués and adjacent portions of the internal surface; and
    e) applying a second sealant layer upon the flexible tape strip.

4. A method of in-situ forming a fluid containment area within an aircraft wing housing, the fluid containment area being defined in part by the internal wing structure, and in part by a plurality of elastomeric bladder appliqués, the method comprising:
    a) applying a first sealant layer to the internal surface of the wing structure;
    b) arranging support material about portions of the internal wing surface;
    c) applying a second sealant layer to the support material;
    d) arranging a plurality of elastomeric bladder appliqués about the internal wing structure, upon the first and second sealant layers;
    e) arranging a plurality of flexible tape strips about the internal wing structure, bridging edge portions of the bladder appliqués and adjacent portions of the internal wing surface; and
    f) applying a third sealant layer upon the flexible tape strips.

* * * * *